United States Patent
Aoki

(10) Patent No.: US 9,509,897 B2
(45) Date of Patent: Nov. 29, 2016

(54) IMAGING APPARATUS AND ITS FOCUS CONTROL METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/695,716

(22) Filed: Apr. 24, 2015

(65) Prior Publication Data

US 2015/0229834 A1  Aug. 13, 2015

Related U.S. Application Data

(63) Continuation of application No. PCT/JP2013/073389, filed on Aug. 30, 2013.

(30) Foreign Application Priority Data

Oct. 26, 2012 (JP) .................. 2012-236823

(51) Int. Cl.
| | |
|---|---|
| *H04N 5/232* | (2006.01) |
| *G02B 7/34* | (2006.01) |
| *G02B 7/36* | (2006.01) |
| *G03B 13/36* | (2006.01) |
| *H04N 5/369* | (2011.01) |
| *G02B 5/20* | (2006.01) |
| *H04N 9/07* | (2006.01) |

(52) U.S. Cl.
CPC .......... *H04N 5/23212* (2013.01); *G02B 5/201* (2013.01); *G02B 7/34* (2013.01); *G02B 7/36* (2013.01); *G03B 13/36* (2013.01); *H04N 5/3696* (2013.01); *H04N 9/07* (2013.01)

(58) Field of Classification Search
CPC .. H04N 5/23212; H04N 9/07; H04N 5/3696; G03B 13/36; G02B 5/201; G02B 5/34; G02B 5/36
See application file for complete search history.

(56) References Cited

U.S. PATENT DOCUMENTS

| | | | |
|---|---|---|---|
| 2014/0028895 A1 | 1/2014 | Endo | |
| 2015/0017832 A1* | 1/2015 | Draaijer | H01R 13/665 439/488 |
| 2015/0124129 A1* | 5/2015 | Aoki | G03B 13/36 348/280 |

FOREIGN PATENT DOCUMENTS

| | | |
|---|---|---|
| JP | 2008-52151 A | 3/2008 |
| JP | 2009-63921 A | 3/2009 |
| JP | 2009-122524 A | 6/2009 |
| JP | 2011-170153 A | 9/2011 |
| JP | 2012-49201 A | 3/2012 |
| WO | WO 2012/132117 A1 | 10/2012 |

OTHER PUBLICATIONS

International Search Report, issued in PCT/JP2013/073389, dated Nov. 26, 2013.
Written Opinion of the International Searching Authority, issued in PCT/JP2013/073389, dated Nov. 26, 2013.
Chinese Office Action issued Aug. 2, 2016 in corresponding Chinese Application No. 201380056119.4.

\* cited by examiner

*Primary Examiner* — Tuan Ho
(74) *Attorney, Agent, or Firm* — Birch, Stewart, Kolasch & Birch, LLP

(57) ABSTRACT

It is intended to provide an imaging apparatus capable of selecting a contrast AF method immediately if a subject is judged not suitable for a phase difference AF method, as well as its focus control method. In an imaging apparatus which switches between a focus control by a phase difference AF method and focus control by a contrast AF method, whether to perform a focus control according to the phase difference AF method is determined according to a color of an image taken in an AF area selected from plural AF areas 52 that are set in a photodetecting surface 50.

11 Claims, 11 Drawing Sheets

IMAGING APPARATUS AND ITS FOCUS CONTROL METHOD

CROSS REFERENCE TO RELATED APPLICATION

This is a continuation of International Application No. PCT/JP2013/073389 filed on Aug. 30, 2013, and claims priority from Japanese Patent Application No. 2012-236823 filed on Oct. 26, 2012, the entire disclosures of which are incorporated herein by reference.

TECHNICAL FIELD

The present invention relates to an imaging apparatus that employs two AF methods, that is, a phase difference AF method and a contrast AF method, and its focus control method.

BACKGROUND ART

Imaging apparatus such as digital still cameras incorporate an AF (autofocus) function. Two AF methods, that is, a phase difference AF method and a contrast AF method, are mainly employed as the AF method of imaging apparatus. Recent imaging apparatus each employ these two methods and use one of the two methods selectively according to a shooting situation.

For example, in the conventional technique disclosed in the following Patent document 1, switching is made between the phase difference AF method and the contrast AF method according to the kind of the shooting lens.

In the conventional technique disclosed in Patent document 2, switching is made between the phase difference AF method and the contrast AF method according to the frequency components of a subject image.

In the conventional technique disclosed in Patent document 3, switching is made between the phase difference AF method and the contrast AF method according to the exposure value.

In the conventional technique disclosed in Patent document 4, switching is made between the phase difference AF method and the contrast AF method according to the subject brightness.

The technique disclosed in Patent document 5 is not of such a type that switching is made between the two methods, Patent document 5 has a statement that if there occurs leakage of light to a phase difference detection pixel from adjacent pixels in the phase difference AF, the leak amounts are corrected for.

PRIOR ART DOCUMENTS

Patent Documents

Patent document 1: JP-A-2011-170153
Patent document 2: JP-A-2009-63921
Patent document 3: JP-A-2012-49201
Patent document 4: JP-A-2008-52151
Patent document 5: JP-A-2009-122524

SUMMARY OF THE INVENTION

Problems to be Solved by the Invention

The phase difference AF method is advantageous over the contrast AF method in that the former is higher in focusing speed than the latter, and the contrast AF method is advantageous over the phase difference AF method in that the former is higher in focusing accuracy than the latter. Camera users demand high-speed detection of a focus position. It is therefore appropriate to detect a focus position first by the phase difference AF method and then detect contrast AF method if a focus position cannot be detected or is calculated erroneously by the phase difference AF method.

However, there are subjects with which a focus position is prone to be calculated erroneously by the phase difference AF method. In such a case, the time to detect a focus position can be shortened by detecting a focus position by the contrast AF method from the beginning.

In the conventional techniques, one of the phase difference AF method and the contrast AF method is selected according to the luminance, exposure value, or frequency components of a subject image. However, relying on only this method cannot cope with subjects with which a focus position is prone to be calculated erroneously by the phase difference AF method. This may disable high-speed AF processing.

An object of the present invention is to provide an imaging apparatus capable of selecting a contrast AF method immediately if a subject is judged not suitable for a phase difference AF method, as well as its focus control method.

Means for Solving the Problems

The invention provides an imaging apparatus having an imaging device that shoots a subject via an imaging optical system including a focus lens, wherein the imaging device includes plural imaging pixels and plural phase difference detection pixels arranged on a photodetecting surface; the plural imaging pixels include imaging pixels of at least three kinds that are different in detection color; the imaging apparatus comprises a focus control unit which selectively performs one of a focus control by a phase difference AF method that uses output signals of the phase difference detection pixels and a focus control by a contrast AF method that uses output signals of the imaging pixels; and the focus control unit decides whether to perform a focus control by the phase difference AF method according to a color of a subject image taken in a phase difference detection area that is set for phase difference detection on the photodetecting surface and includes imaging pixels of the at least three kinds and phase difference detection pixels.

The invention also provides a focus control method of an imaging apparatus having an imaging device that shoots a subject via an imaging optical system including a focus lens, wherein the imaging device includes plural imaging pixels and plural phase difference detection pixels arranged on a photodetecting surface; the plural imaging pixels include imaging pixels of at least three kinds that are different in detection color; the focus control method comprises a focus control step of selectively performing one of a focus control by a phase difference AF method that uses output signals of the phase difference detection pixels and a focus control by a contrast AF method that uses output signals of the imaging pixels; and the focus control step decides whether to perform a focus control by the phase difference AF method according to a color of a subject image taken in a phase difference detection area that is set for phase difference detection on the photodetecting surface and includes imaging pixels of the at least three kinds and phase difference detection pixels.

Advantages of the Invention

The invention can provide an imaging apparatus capable of selecting a contrast AF method immediately if a subject is not suitable for a phase difference AF method, as well as its focus control method.

MODES FOR CARRYING OUT THE INVENTION

An embodiment of the present invention will be hereinafter described with reference to the drawings.

Figure 1:
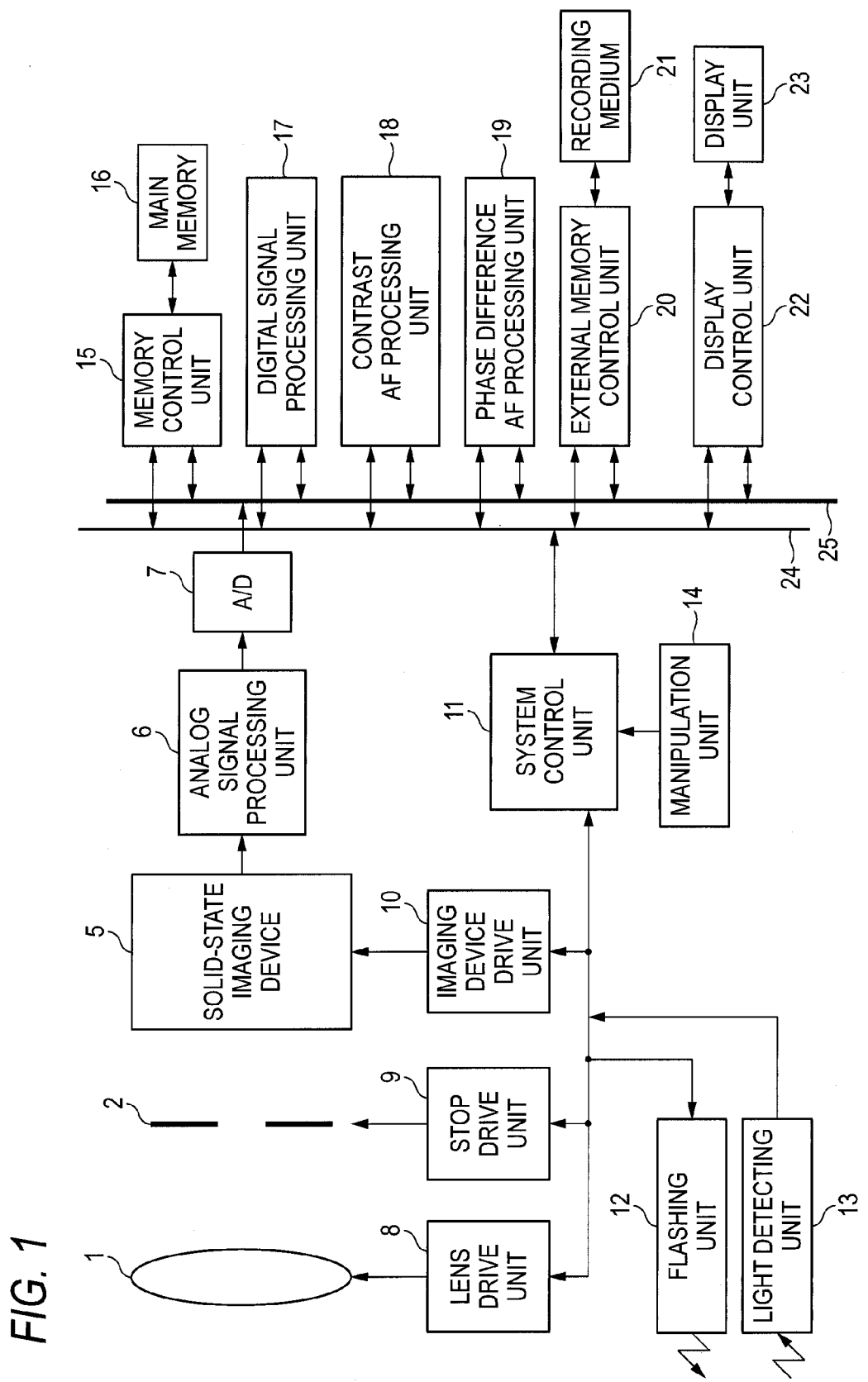
FIG. 1 is a block diagram showing the functional configuration of an imaging apparatus according to an embodiment of the present invention.

FIG. 1 shows a general configuration of a digital camera according to the embodiment which is an example of the imaging apparatus according to the invention.

An imaging system of the digital camera shown in FIG. 1 is equipped with a lens device (a shooting lens 1 and a stop 2 are included) which serves as an imaging optical system and a CCD, CMOS, or like solid-state imaging device 5 which shoots a subject through the lens device. The lens device which includes the shooting lens 1 and the stop 2 is detachable from or is fixed to the camera body.

The shooting lens 1 includes a focus lens for focusing and a zoom lens for changing the focal length. The zoom lens can be omitted.

A system control unit 11 which supervises the overall electrical control system of the digital camera controls a flashing unit 12 and a light detecting unit 13. The system control unit 11 adjusts the positions of the focus lens the zoom lens of the shooting lens 1 which are included in the shooting lens 1 by controlling a lens drive unit 8. Furthermore, the system control unit 11 adjusts the exposure amount by controlling the aperture of the stop 2 via a stop drive unit 9.

Still further, the system control unit 11 drives the solid-state imaging device 5 via an imaging device drive unit 10 and thereby causes the solid-state imaging device 5 to output, in the form of a shot image signal, a subject image taken through the shooting lens 1. An instruction signal from a user is input to the system control unit 11 through a manipulation unit 14.

As described later, the system control unit 11 selects one of a contrast AF processing unit 18 and a phase difference AF processing unit 19 according to a subject color and performs a focus control on the shooting lens 1 according to a focus position determined by the selected processing unit.

The electrical control system of the digital camera is also equipped with an analog signal processing unit 6 which is connected to the output of the solid-state imaging device 5 and performs analog signal processing such as correlation double sampling processing and an A/D conversion circuit 7 which converts an analog signal that is output from the analog signal processing unit 6 into a digital signal. The analog signal processing unit 6 and the A/D conversion circuit 7 are controlled by the system control unit 11. The analog signal processing unit 6 and the A/D conversion circuit 7 may be incorporated in the solid-state imaging device 5.

The electrical control system is further equipped with a main memory 16, a memory control unit 15 which is connected to the main memory 16, a digital signal processing unit 17 which generates shot image data by performing interpolation calculation, gamma correction calculation, RGB/YC conversion processing, etc. on a shot image signal that is output from the A/D conversion circuit 7, a contrast AF processing unit 18 which determines a focus position by a contrast AF method, a phase difference AF processing unit 19 which determines a focus position by a phase difference AF method, an external memory control unit 20 to which a detachable recording medium 21 is connected, and a display control unit 22 to which a display unit 23 is connected which is installed on the camera back side, for example. The memory control unit 15, digital signal processing unit 17, contrast AF processing unit 18, phase difference AF processing unit 19, external memory control unit 20, and display control unit 22 are connected to each other by a control bus 24 and a data bus 25 and controlled according to instructions from the system control unit 11.

Figure 2:
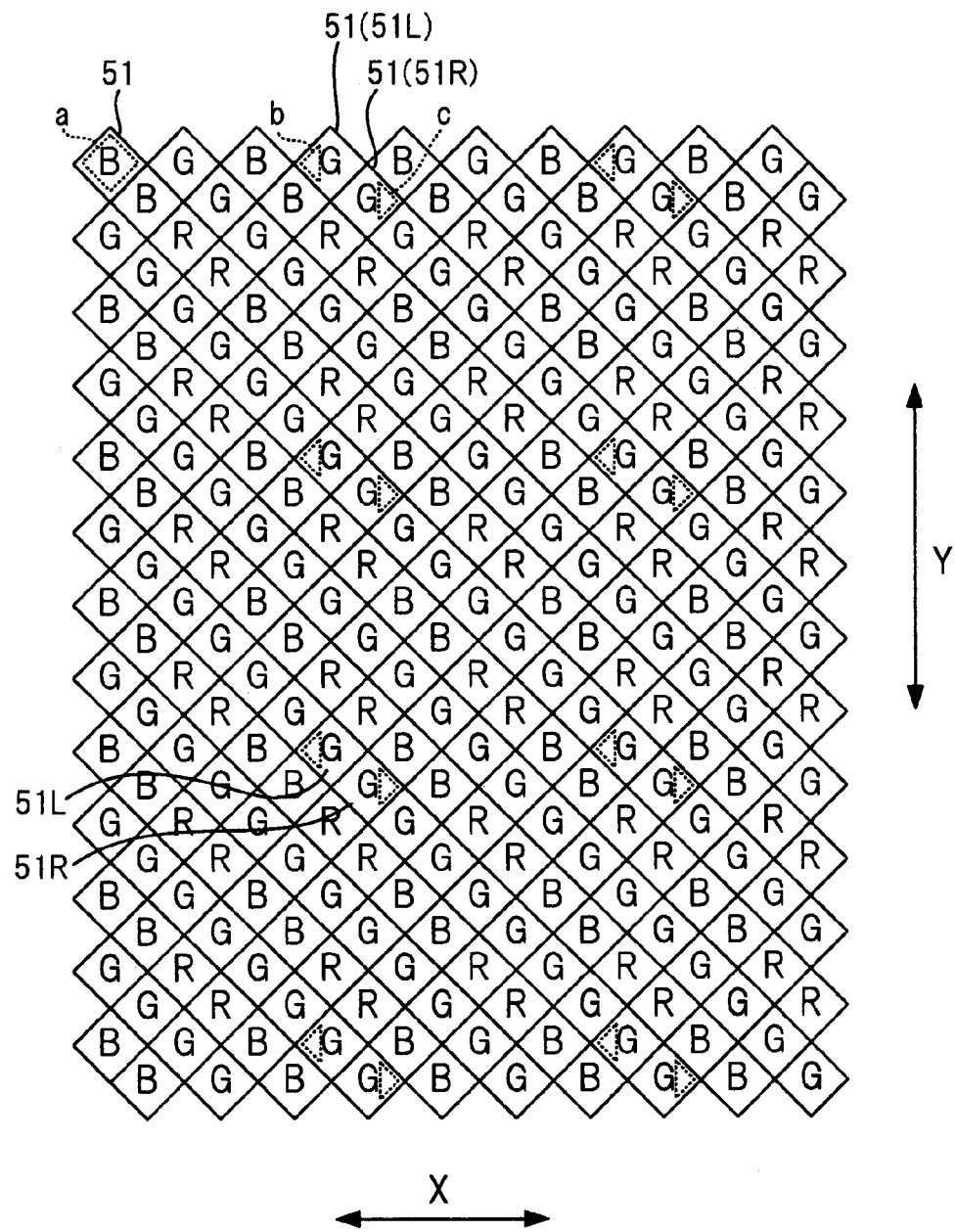
FIG. 2 is a plan view of an essential part of a photodetecting surface of a solid-state imaging device shown in FIG. 1.

FIG. 2 is an enlarged view of part of the solid-state imaging device 5 installed in the digital camera and shows its planar configuration.

The solid-state imaging device 5 has a large number of pixels (square blocks in the figure) which are arranged on the photodetecting surface two-dimensionally, that is, in a row direction X and a column direction Y which is perpendicular to the row direction X. Not all of the pixels 51 are shown in FIG. 2; actually, about several millions to ten million and tens of thousands of pixels 51 are arranged two-dimensionally. When shooting is performed by the solid-state imaging device 5, output signals are output from the large number of pixels 51, respectively.

Each pixel 51 includes a photoelectric conversion portion such as a photodiode and a color filter that is formed over the photoelectric conversion portion.

In FIG. 2, each pixel 51 including a color filter that transmits red light (R filter) is given a character "R," each pixel 51 including a color filter that transmits green light (G filter) is given a character "G," and each pixel 51 including a color filter that transmits blue light (B filter) is given a character "B."

The large number of pixels 51 constitute an array in which plural pixel rows in each of which plural pixels 51 are arranged in the row direction X are arranged in the column direction Y. The odd-numbered pixel rows and the even-numbered pixel rows are deviated from each other in the row direction X by approximately half of the arrangement pitch of the pixels 51 of each pixel row.

The color filters included in the pixels 51 of the odd-numbered pixel rows are Bayer-arranged as a whole, and the color filters included in the pixels 51 of the even-numbered pixel rows are also Bayer-arranged as a whole. Each pixel 51 of each odd-numbered pixel row and the pixel 51 that is adjacent to and is located on the bottom-right of it and serves to detect light of the same color as it constitute a pair. In this specification, the term "two pixels adjacent to each other" mean two such pixels that the line segment connecting their centers is shortest.

With the solid-state imaging device 5 having the above-described pixel arrangement, the sensitivity of the camera can be increased by adding output signals of each pair of pixels 51 together. Furthermore, the dynamic range of the camera can be increased by changing the exposure times of each pair of pixels 51 and adding their output signals together.

In the solid-state imaging device 5, part of the pairs are made pairs for phase difference detection (hereinafter also referred to as "phase difference pairs"). In the example of FIG. 2, each phase difference pair consists of a phase difference detection pixel 51R and a phase difference detection pixel 51L that are adjacent to each other diagonally. The phase difference pair is not limited to pair pixels of the same color that are adjacent to each other and may be pair pixels of the same color that are spaced from each other by a distance of one, two, or several pixels, for example.

Each phase difference detection pixel 51R receives one of a pair of light beams that have passed through different portions of the pupil area of the shooting lens 1 (e.g., a light beam that has passed through the right half of the pupil area) and outputs a signal corresponding to a received light quantity. That is, each phase difference detection pixel 51R of the solid-state imaging device 5 serves to detect an image that is formed by one of a pair of light beams that have passed through different portions of the pupil area of the shooting lens 1.

Each phase difference detection pixel 51L receives the other of the above-mentioned pair of light beams (e.g., a light beam that has passed through the left half of the pupil area) and outputs a signal corresponding to a received light quantity. That is, each phase difference detection pixel 51L of the solid-state imaging device 5 serves to detect an image that is formed by the other of the pair of light beams that have passed through the different portions of the pupil area of the shooting lens 1.

The plural pixels 51 (hereinafter referred to as "imaging pixels") other than the phase difference detection pixels 51R and 51L each serve to detect an image that is formed by a light beam that has passed through almost all of the pupil area of the shooting lens 1. Among the imaging pixels 51, ones having an R filter are referred to as R pixels 51, ones having an G filter are referred to as G pixels 51, and ones having an B filter are referred to as B pixels 51.

A light shield film is formed over the photoelectric conversion portions of the respective pixels 51, and openings that define photodetecting regions of the photoelectric conversion portions are formed through the light shield film.

The center of the opening (indicated by symbol a in FIG. 2) of each imaging pixel 51 coincides with the center of the photoelectric conversion portion of the imaging pixel 51 (the center of the square block). In FIG. 2, to simplify it, an opening a is shown for only one imaging pixel 51.

In contrast, the center of the opening (indicated by symbol c in FIG. 2) of each phase difference detection pixel 51R is deviated rightward from the center of the photoelectric conversion portion of the phase difference detection pixel 51R. The center of the opening (indicated by symbol b in FIG. 2) of each phase difference detection pixel 51L is deviated leftward from the center of the photoelectric conversion portion of the phase difference detection pixel 51L.

In the solid-state imaging device 5, part of the pixels 51 having a green color filter are made the phase difference detection pixels 51R and the phase difference detection pixels 51L.

In the illustrated example, the phase difference detection pixels 51R are arranged discretely and cyclically in the area where the pixels 51 are arranged. The phase difference detection pixels 51L are also arranged in the same manner.

In the example of FIG. 2, phase difference detection pixels 51R are arranged every four pixels in the row direction X in part of the even-numbered pixel rows (in FIG. 2, four pixel rows arranged every four pixel rows). In the example of FIG. 2, phase difference detection pixels 51R are arranged every four pixels in the row direction X in part of the even-numbered pixel rows (in FIG. 2, four pixel rows arranged every four pixel rows). In the example of FIG. 2, phase difference detection pixels 51L are arranged at the same cycle as the phase difference detection pixels 51R in the row direction X in part of the odd-numbered pixel rows (i.e., in the pixel rows adjacent to the respective pixel rows that include phase difference detection pixels 51R).

With the above structure, light that is received by each pixel 51L past the opening b of the light shield film is mainly light that passes through the left-hand part (as viewed from a subject) of the shooting lens 1 which is disposed over the paper surface of FIG. 2, that is, light that comes from such a direction that the subject is seen by the right eye. Light that is received by each pixel 51R past the opening c of the light shield film is mainly light that passes through the right-hand part (as viewed from the subject) of the shooting lens 1, that is, light that comes from such a direction that the subject is seen by the left eye.

That is, every phase difference detection pixel 51R can produce a shot image signal in the same manner as the subject is seen by the left eye and every phase difference detection pixel 51L can produce a shot image signal in the same manner as the subject is seen by the right eye. Therefore, phase difference information can be obtained by performing a correlation calculation on a combination of those signals.

Each pair of a phase difference detection pixel 51R and a phase difference detection pixel 51L produce phase difference information because their openings are deviated in the light shield film in the opposite directions. However, the structure for producing phase difference information is not limited to it and any of well-known structures may be employed. One example is a structure that each phase difference pair is provided with a common microlens (top lens).

Figure 3:
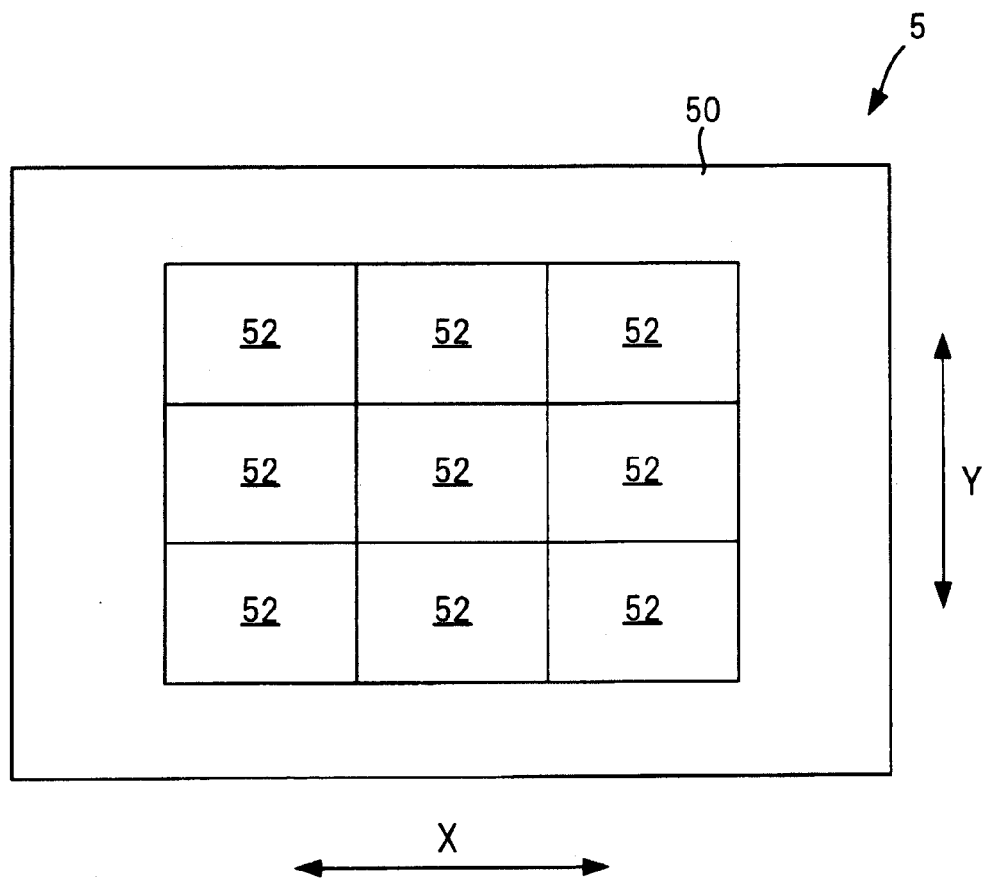
FIG. 3 illustrates the photodetecting surface of the solid-state imaging device shown in FIG. 1.

FIG. 3 is a schematic plan view showing the overall configuration of the solid-state imaging device 5 installed in the digital camera shown in FIG. 1.

The solid-state imaging device 5 has a photodetecting surface 50 in which all of the pixels 51 are arranged. In the example of FIG. 2, the photodetecting surface 50 is provided with nine phase difference detection areas (hereinafter referred to as "AF areas") 52 for acquisition of phase difference information.

Each AF area 52 is an area that includes imaging pixels 51 having an R filter, imaging pixels 51 having a G filter, imaging pixels 51 having a B filter, and plural phase difference pairs.

Only imaging pixels 51 are disposed in the area, excluding the AF areas 52, on the photodetecting surface 50. The AF areas 52 may be disposed so as to occupy the entire photodetecting surface 50.

The phase difference AF processing unit 19 shown in FIG. 1 calculates a phase difference amount that is a relative positional deviation between two respective images formed by a pair of light beams (described above) using output signals that are read out of the phase difference detection pixels 51L and the phase difference detection pixels 51R existing in one, selected by a user manipulation or the like, of the nine AF areas 52. Based on the calculated phase difference amount, the phase difference AF processing unit 19 determines a focus adjusting state of the shooting lens 1 which is, in the embodiment, an amount of deviation from a focused state and its direction, that is, a defocus amount. Then the phase difference AF processing unit 19 determines a focus position of the focus lens on the basis of the defocus amount.

The contrast AF processing unit 18 shown in FIG. 1 analyzes an image taken by the one AF area 52 selected from the nine AF areas 52 by the user manipulation or the like and thereby determines a focus position of the shooting lens 1 by a known contrast AF method.

More specifically, as the focus lens of the shooting lens 1 is moved (i.e., its position is varied) under the control of the system control unit 11, the contrast AF processing unit 18 calculates contrast (light-dark difference) of an image produced at each movement position. The contrast AF processing unit 18 determines, as a focus position, a position of the focus lens where maximum contrast is obtained.

The digital camera may be configured so that plural continuous AF areas 52 can be selected as well as one AF area 52.

Figure 11:
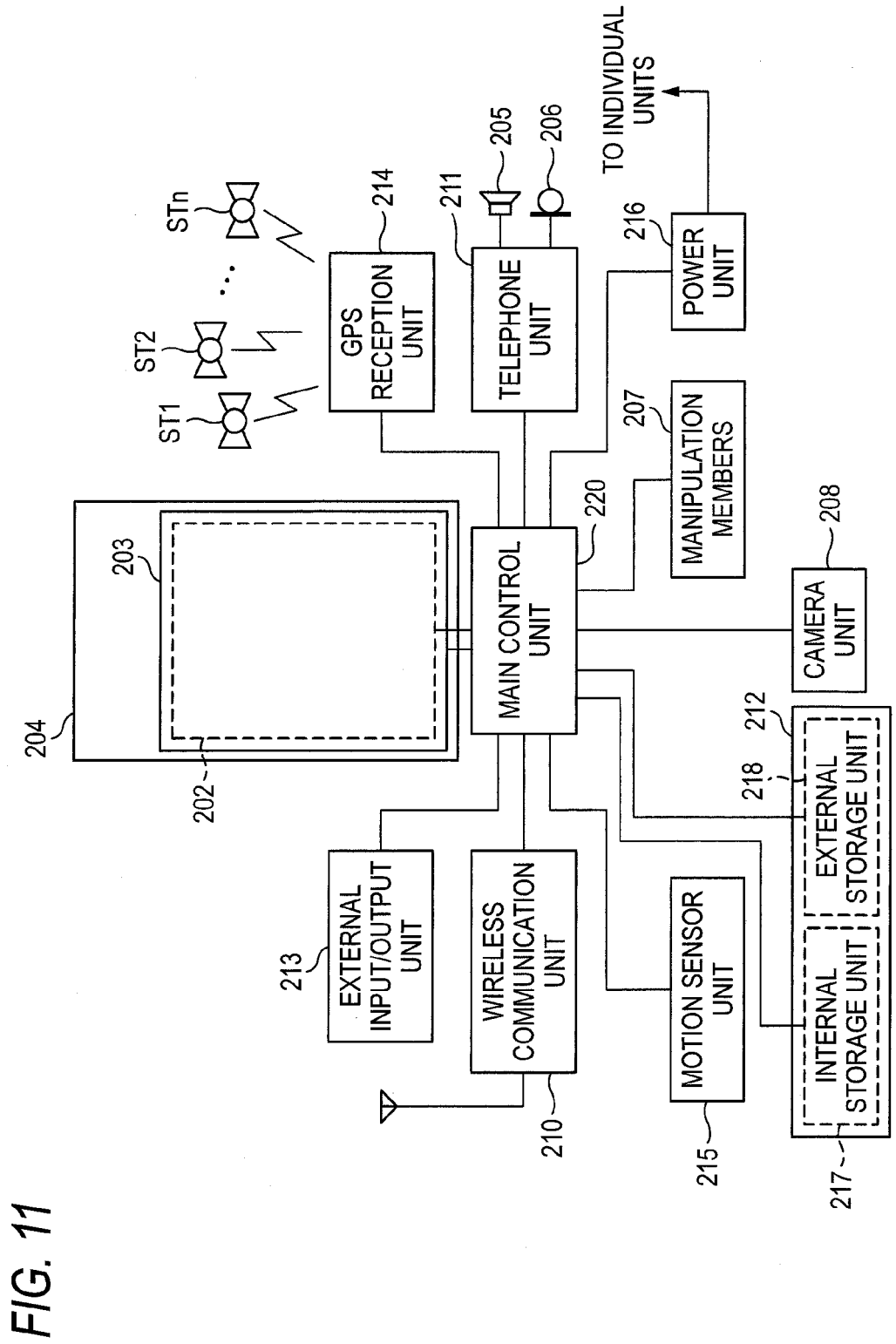
FIG. 11 is a block diagram showing the functional configuration of the smartphone shown in FIG. 10.

The system control unit 11 shown in FIG. 11 judges a color of a subject image taken by a selected AF area 52, and selects one of the contrast AF processing unit 18 and the phase difference AF processing unit 19 according to the judged color. The system control unit 11 causes the selected contrast AF processing unit 18 or phase difference AF processing unit 19 to determine a focus position, and performs a control so that the focus lens of the shooting lens 1 is moved to the focus position on the basis of the determined focus position.

In the solid-state imaging device 5, if an appreciable amount light leaks to each of the phase difference detection pixels 51L and 51R from imaging pixels 51 adjacent to it (color contamination), the accuracy of the phase difference AF lowers as described in Patent document 5, for example.

For example, in the pixel arrangement shown in FIG. 2, if a red component or a blue component is large relative to a green component in a subject image taken with any AF area 52, appreciable amounts of light leak from R pixels 51 or B pixels to the phase difference detection pixels 51L and 51R and affect a phase difference detection amount.

In particular, red light are smaller in the coefficient of absorption by a semiconductor than light of the other colors and hence goes deep into the semiconductor. This may results in noticeable color contamination in the phase difference detection pixels due to obliquely incident red light.

In view of the above, in the embodiment, if a color component of a color other than the phase difference detection color of the phase difference detection pixels 51L and 51R is much larger than a color component detected by the phase difference detection pixels 51L and 51R in a subject image taken with a selected AF area 52, it is judged that high AF accuracy will not be obtained by the phase difference AF method and hence the contrast AF method is selected. Conversely, if the color of a subject image taken with a selected AF area 52 is not too reddish or bluish, the phase difference AF method is selected. In this manner, a high-speed, high-accuracy operation is enabled by selecting the contrast AF method in the case of a subject color with which it is difficult to determine a focus position by the phase difference AF method.

Figure 4:
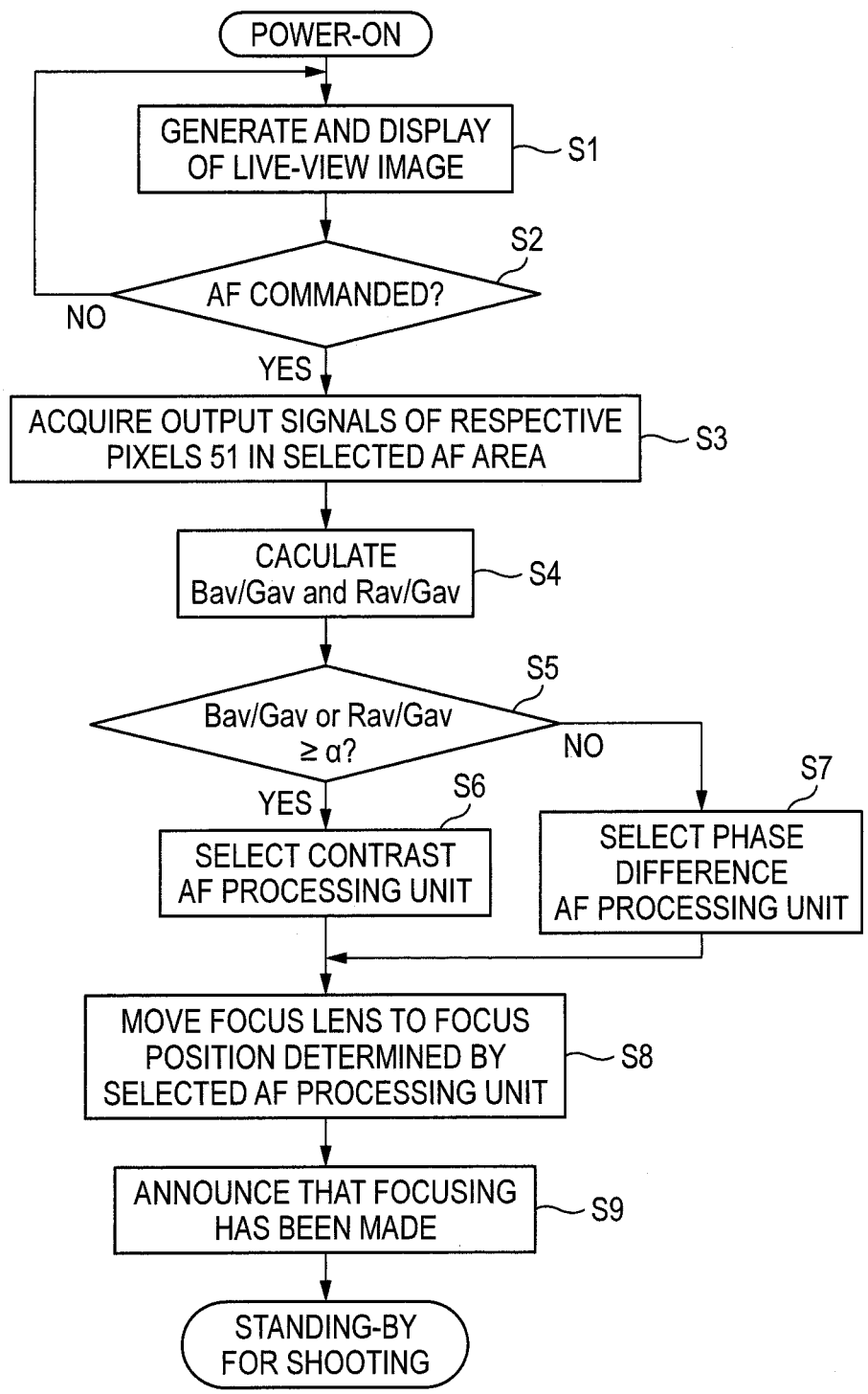
FIG. 4 is a flowchart for description of an AF operation of the digital camera shown in FIG. 1.

FIG. 4 is a flowchart for description of an operation of the digital camera shown in FIG. 1.

Upon setting of a shooting mode, shooting by the solid-state imaging device 5 for generation of a live-view image is started and a live-view image is displayed on the display unit 23 (step S1). If AF is commanded by half depression of the shutter button (step S2: yes), the system control unit 11 acquires output signals of the pixels 51 in a pre-selected AF area 52 from shot image signals produced by shooting by the solid-state imaging device 5 immediately before or after the AF commanding (step S3).

Then the system control unit 11 calculate an average of output signal amounts of each of the set of R pixels 51, the set of G pixels 51, and the set of B pixels excluding output signals of the phase difference detection pixels 51L and 51R among the acquired output signals.

The system control unit 11 calculates Bav/Gav and Bav/Gav, where Rav, Gav, and Bav represent an average of output signals of the R pixels 51, an average of output signals of the G pixels 51, an average of output signals of the B pixels 51, respectively (step S4).

Bav/Gav indicates in what proportion a blue component exists in the subject image taken with the selected AF area 52 relative to a green component to be detected by the phase difference detection pixels.

Rav/Gav indicates in what proportion a red component exists in the subject image taken with the selected AF area 52 relative to the green component. Therefore, a color of the subject image taken with the selected AF area 52 can be judged on the basis of the magnitudes of Bav/Gav and Rav/Gav.

As the Bav/Gav value increases, more blue light leaks into the phase difference detection pixels 51L and 51R and the phase difference calculation accuracy lowers. As the Rav/Gav value increases, more red light leaks into the phase difference detection pixels 51L and 51R and the phase difference calculation accuracy lowers.

Therefore, in the digital camera shown in FIG. 1, a threshold value α is set at a lower limit of an unallowable range of each of Bav/Gav and Rav/Gav in terms of phase difference calculation accuracy.

The system control unit 11 judges whether Bav/Gav or Rav/Gav is larger than or equal to the threshold value α (step S5).

If the judgment result of step S5 is affirmative, the system control unit 11 judges that the subject color is such that the contrast AF accuracy will be too low to be acceptable and selects the contrast AF processing unit 18 (step S6). On the other hand, if the judgment result of step S5 is negative, the system control unit 11 judges that the subject color is such that the contrast AF accuracy will be acceptable and selects the phase difference AF processing unit 19 (step S7).

After the execution of step S6 or S7, the system control unit 11 causes the selected AF processing unit to determine a focus position and moves the focus lens to the determined focus position (step S8).

Then the system control unit 11 announces that focusing has been made by displaying information to that effect on the display unit 23 or causing a speaker to produce a sound indicating that (step S9).

Then a shooting standby state is established. Upon full depression of the shutter button, shooting for image recording is performed by the solid-state imaging device 5.

In the pixel arrangement shown in FIG. 2, of the R pixel 51 and the B pixel 51 that are adjacent to each phase difference detection pixel 51L, the R pixel 51 is more distant from the opening b of the phase difference detection pixel 51L than the B pixel 51 is. The same is true of each phase difference detection pixel 51R. Therefore, it is possible to disregard the influence, on the phase difference AF accuracy, of the color contamination from R pixels 51.

In this case, step S5 in FIG. 4 may be modified so that the process moves to step S6 if Bav/Gav is larger than or equal to α and to step S7 if Bav/Gav is smaller than α.

Figure 5:
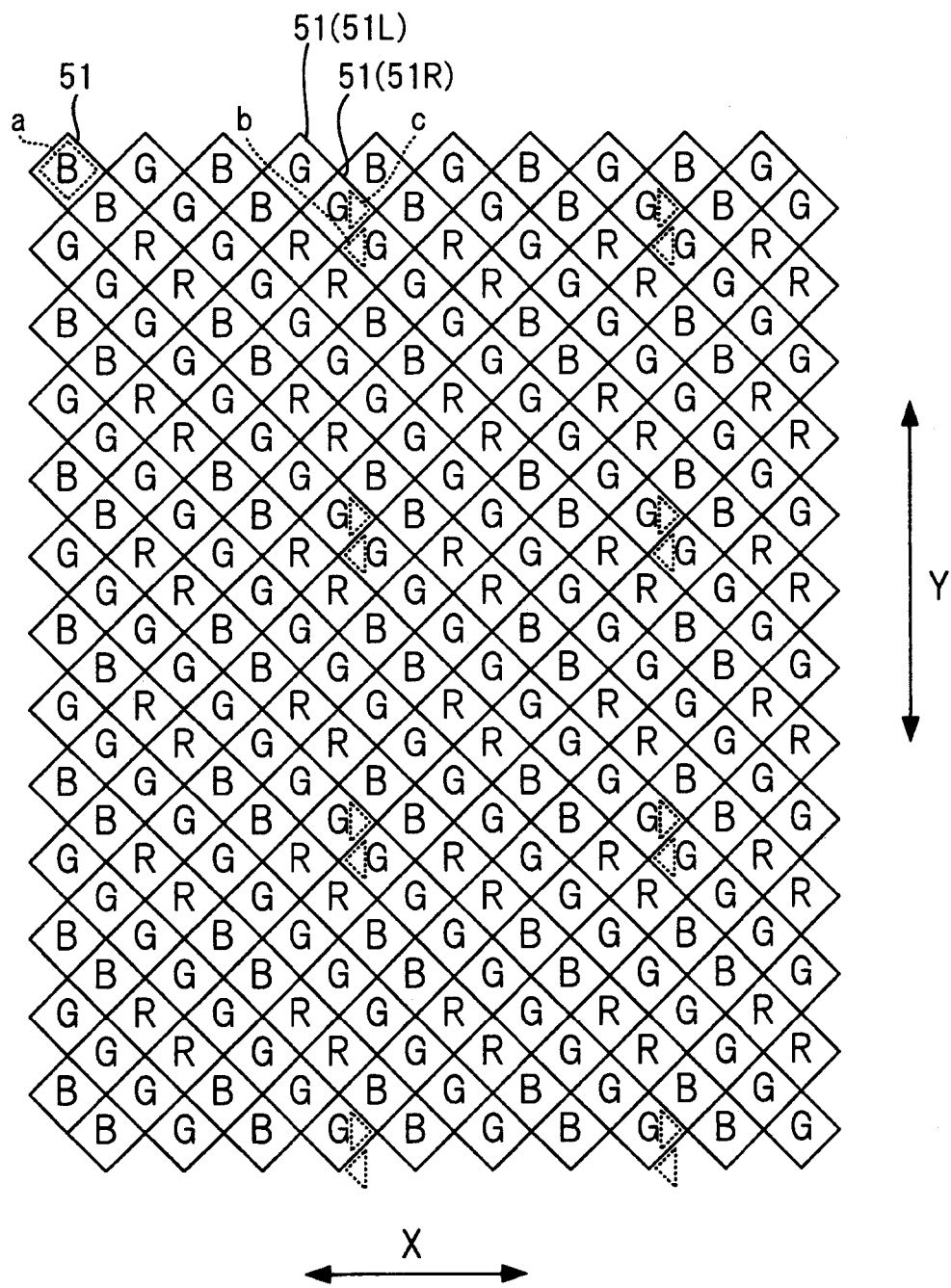
FIG. 5 shows a modification of the pixel arrangement of the solid-state imaging device shown in FIG. 1.

For example, in a pixel arrangement shown in FIG. 5 that is different from the pixel arrangement shown in FIG. 2 in that the position of each phase difference detection pixel 51L is changed to the bottom-right of the associated phase difference detection pixel 51R, the B pixel 51 is closer to the opening b and the R pixel 51 is closer to the opening c. In this case, it is preferable that a judgment be made on the basis of the magnitudes of both of Bav/Gav and Rav/Gav.

Although at step S5 in FIG. 4 the same threshold value is used for Bav/Gav and Rav/Gav, the use of different threshold values may be appropriate depending on the arrangement of the color filters. Red light is longer in wavelength than blue light and hence tends to cause color contamination. Therefore, in a pixel arrangement with which in each phase difference detection pixel the probability of occurrence of color contamination caused by the R pixel is approximately equal to that of color contamination caused by the B pixel, it is preferable that the threshold value for Rav/Gav be set smaller than that for Bav/Gav.

At step S4, Rav is calculated as an average of output signal amounts of all of the R pixels in the AF area 52. However, only pixels around each phase difference detection pixel can cause its color contamination. Therefore, Rav may be calculated as an average of output signal amounts of the R pixels 51 that are adjacent to the phase difference detection pixels 51L and 51R rather than an average of output signal amounts of all of the R pixels in the AF area 52.

Likewise, Bav may be calculated as an average of output signal amounts of the B pixels 51 that are adjacent to the phase difference detection pixels 51L and 51R.

Gav may be calculated as an average of output signal amounts of G pixels 51 that are located at the same positions in the row direction X as and are closest to the phase difference detection pixels 51L and 51R.

The above measure can decrease the amount of calculation and thereby increase the AF speed.

At step S4, instead of Bav/Gav and Rav/Gav, Gav/Bav and Gav/Rav may be calculated as a ratio between a green component and a red component of a subject image and a ratio between the green component and a blue component.

As the Gav/Bav value decreases, more blue light leaks into the phase difference detection pixels 51L and 51R and the phase difference calculation accuracy lowers. As the Gav/Rav value decreases, more red light leaks into the phase difference detection pixels 51L and 51R and the phase difference calculation accuracy lowers.

Therefore, where Gav/Bav and Gav/Rav are calculated at step S4, a threshold value α is set at an upper limit of an unallowable range of each of Bav/Gav and Rav/Gav in terms of phase difference calculation accuracy. Step S6 is executed if Gav/Bav or Gav/Rav is smaller than or equal to the threshold value α in step S5 shown in FIG. 4, and step S7 is executed if Gav/Bav or Gav/Rav is larger than the threshold value α.

Figure 6:
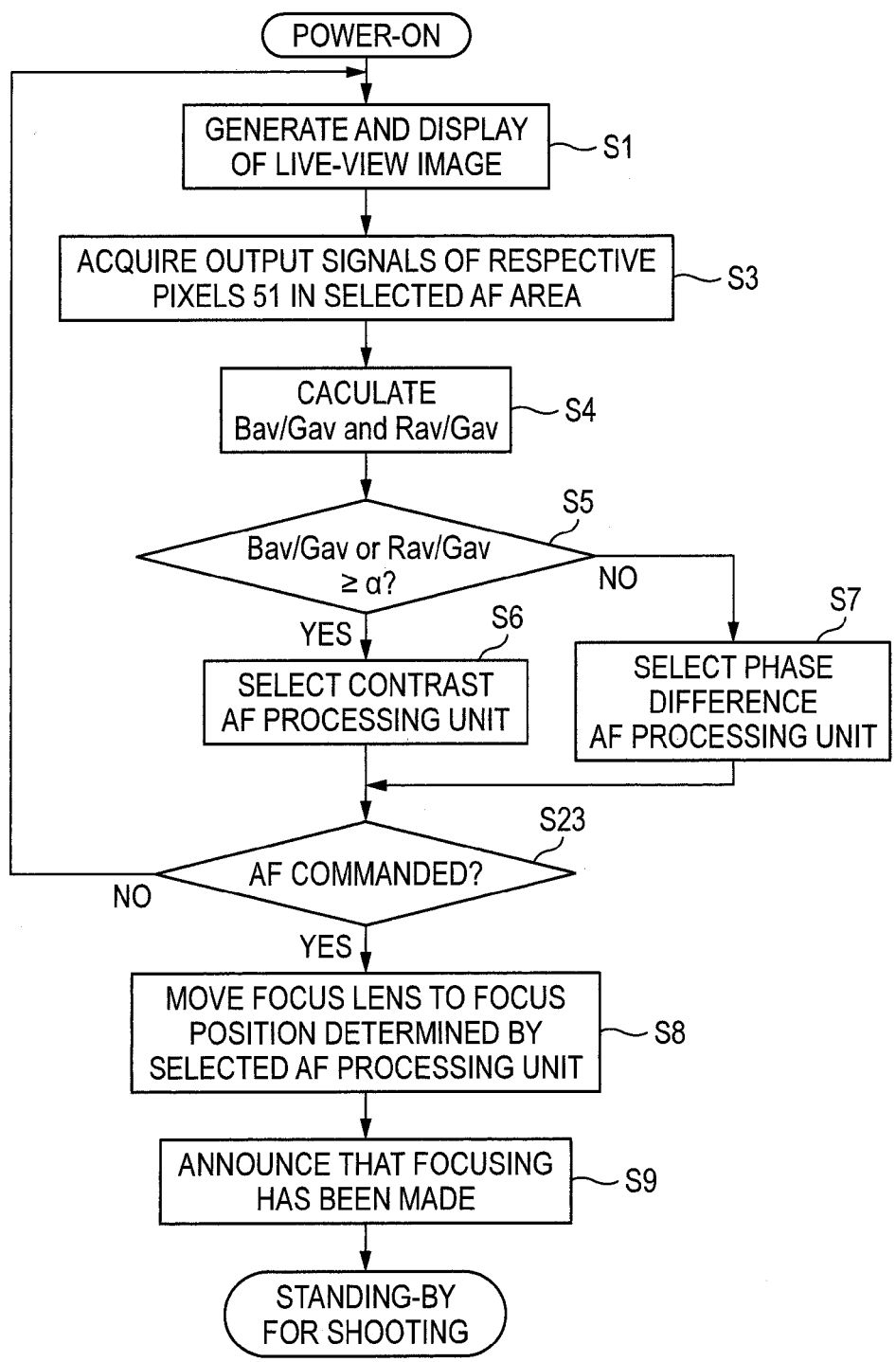
FIG. 6 is a flowchart for description of another AF operation (first modification) of the digital camera shown in FIG. 1.

FIG. 6 is a flowchart for description of another operation (first modification) of the digital camera shown in FIG. 1. In FIG. 6, steps having the same ones in the processing procedure of FIG. 4 are given the same reference symbols as the latter.

After generation and display of a live-view image is started at step S1, steps S3-S7 are executed using shot image signals that are output from the solid-state imaging device 5.

After execution of steps S6 or S7, if AF is not commanded by half depression of the shutter button (step S23: no), the system control unit 11 returns the process to step S1. That is, after the power-on of the digital camera, steps S1-S7 are executed regularly until AF is commanded.

If AF is commanded by half depression of the shutter button after execution of steps S6 or S7 (step S23: yes), the system control unit 11 executes step S8.

By determining which of contrast AF and phase difference AF should be performed before commanding of AF in the above-described manner, the time that is taken from AF commanding to movement of the focus lens to a focus position can be shortened, that is, the AF speed can be increased.

Figure 7:
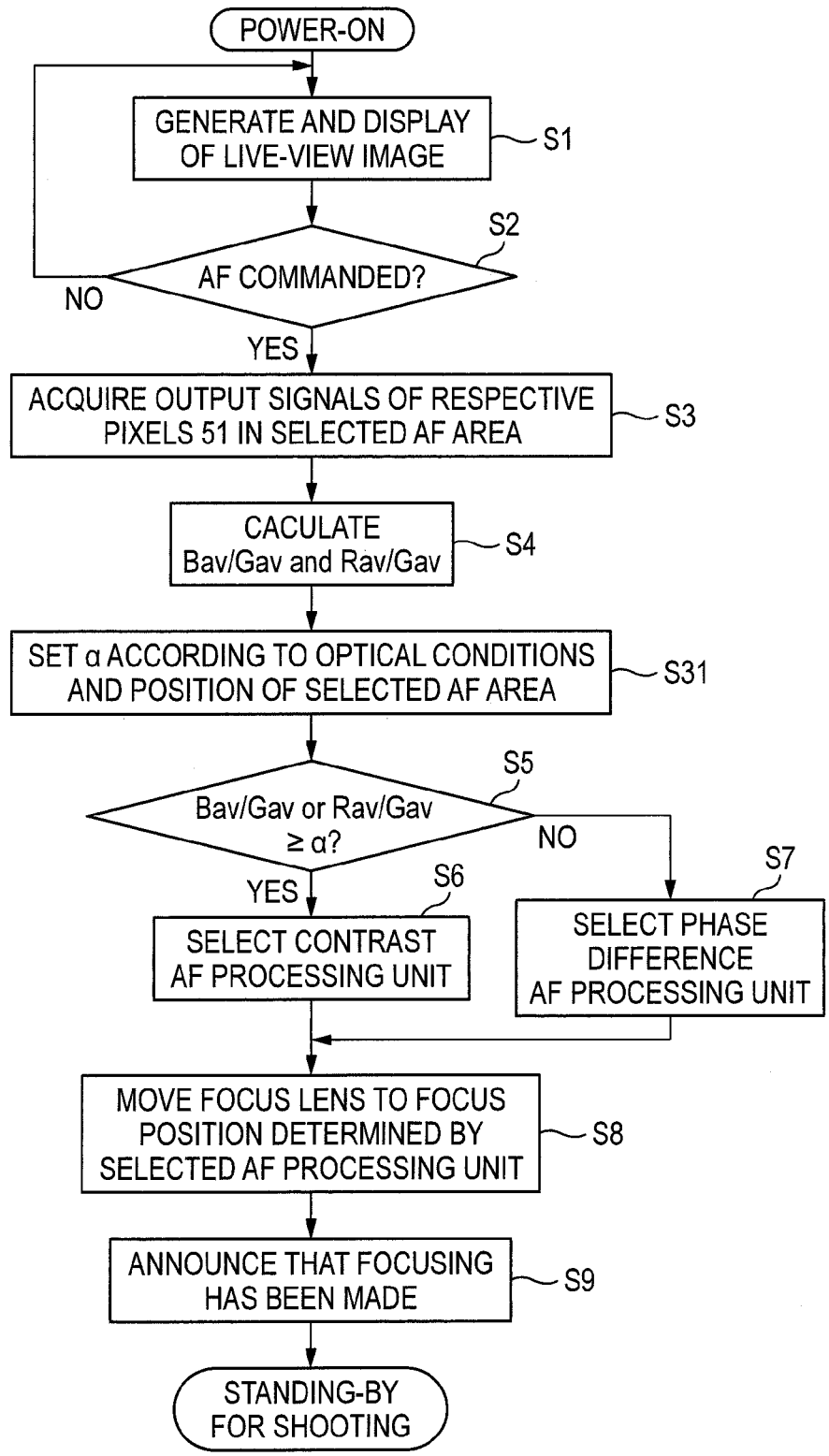
FIG. 7 is a flowchart for description of still another AF operation (second modification) of the digital camera shown in FIG. 1.

FIG. 7 is a flowchart for description of still another AF operation (second modification) of the digital camera shown in FIG. 1. This processing procedure is different from that of FIG. 4 only in that step S31 is inserted between steps S4 and S5. At step S31, a threshold value α to be used at the judgment step S5 is set.

In the phase difference AF processing method, if the degree of color contamination to each phase difference detection pixel from the adjacent pixels is high, an error tends to occur at a high probability and hence high AF accuracy is not expected. The amount of color contamination depends on the incident angle of light with respect to the phase difference detection pixel; the amount of color contamination, that is, the amount of leak light from an adjacent pixel, increases as the incident angle with respect to the phase difference detection pixel goes away from the angle of perpendicular incidence.

In view of the above, in this modification, the threshold value α is determined according to the angle of incidence of light on a selected AF area 52.

The angle of incidence of light on a pixel 51 is determined by optical conditions of the imaging optical system (at least one of an F value of the imaging optical system, a focal length of the imaging optical system (a position of the zoom lens), and a position of the focus lens). The angle of incidence of light on a pixel 51 also varies depending on the position of the AF area 52 to which the pixel 51 belongs. For example, referring to FIG. 3, more oblique light beams are incident on the four corner AF areas 52 than the center AF area 52.

In view of the above, for example, threshold values α, that is, α1, α2, . . . , αi, are generated as table data for all combinations of an F value, a zoom lens position, and a focus lens position and for each AF area 52 and stored in a memory such as a ROM in advance.

More specifically, with an incidence angle 0° defined as the angle of perpendicular incidence of light on the photo-detecting surface 50, the threshold value αi is set smaller as the average of angles of incidence of light on the phase difference detection pixels 51L and 51R in an AF area 52 increases.

At step S31, the system control unit 11 reads, from the memory, a threshold value αi that corresponds to optical conditions that were employed at the time of AF commanding and the position of a selected AF area 52 and sets it as a threshold value α to be used at the judgment step S5.

In this embodiment, since a proper threshold value α is set according to optical conditions of the imaging optical system and the position of a selected AF area 52, the probability is high that the phase difference AF processing method is selected suitably.

For example, where only one AF area 52 can be set at the center in the photodetecting surface 50, the threshold value α is not changed depending on the position of an AF area 52. Therefore, in this case, threshold values α are determined for respective sets of optical conditions and stored in the memory in advance. At step S31, the system control unit 11 reads, from the memory, a threshold value αi that corresponds to optical conditions that were employed at the time of AF commanding and sets it as a threshold value α to be used at the judgment step S5.

The modification of FIG. 7 can also be applied to the modification of FIG. 6. That is, step S31 shown in FIG. 7 may be inserted between step S4 and S5 in FIG. 6. In this case, at step S31, the system control unit 11 reads, from the memory, a threshold value αi that corresponds to optical conditions that were employed at the time of shooting that produced output signals were acquired at step S3 and the position of a selected AF area 52 and sets it as a threshold value α to be used at the judgment step S5.

Figure 8:
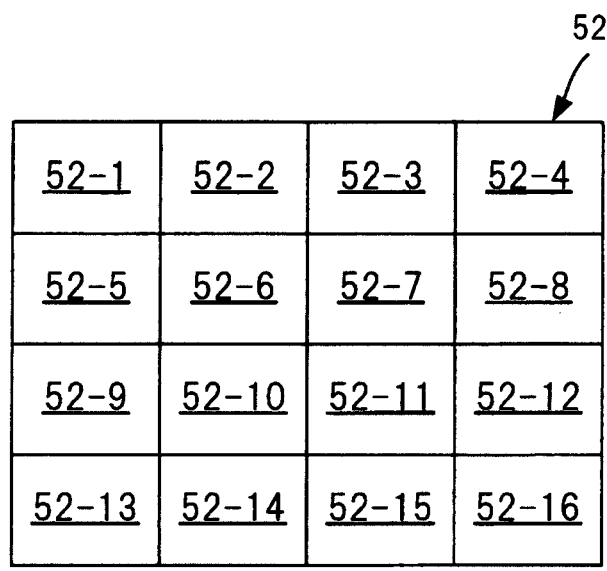
FIG. 8 illustrates a further example AF operation (third modification) of the digital camera shown in FIG. 1.
Figure 9:
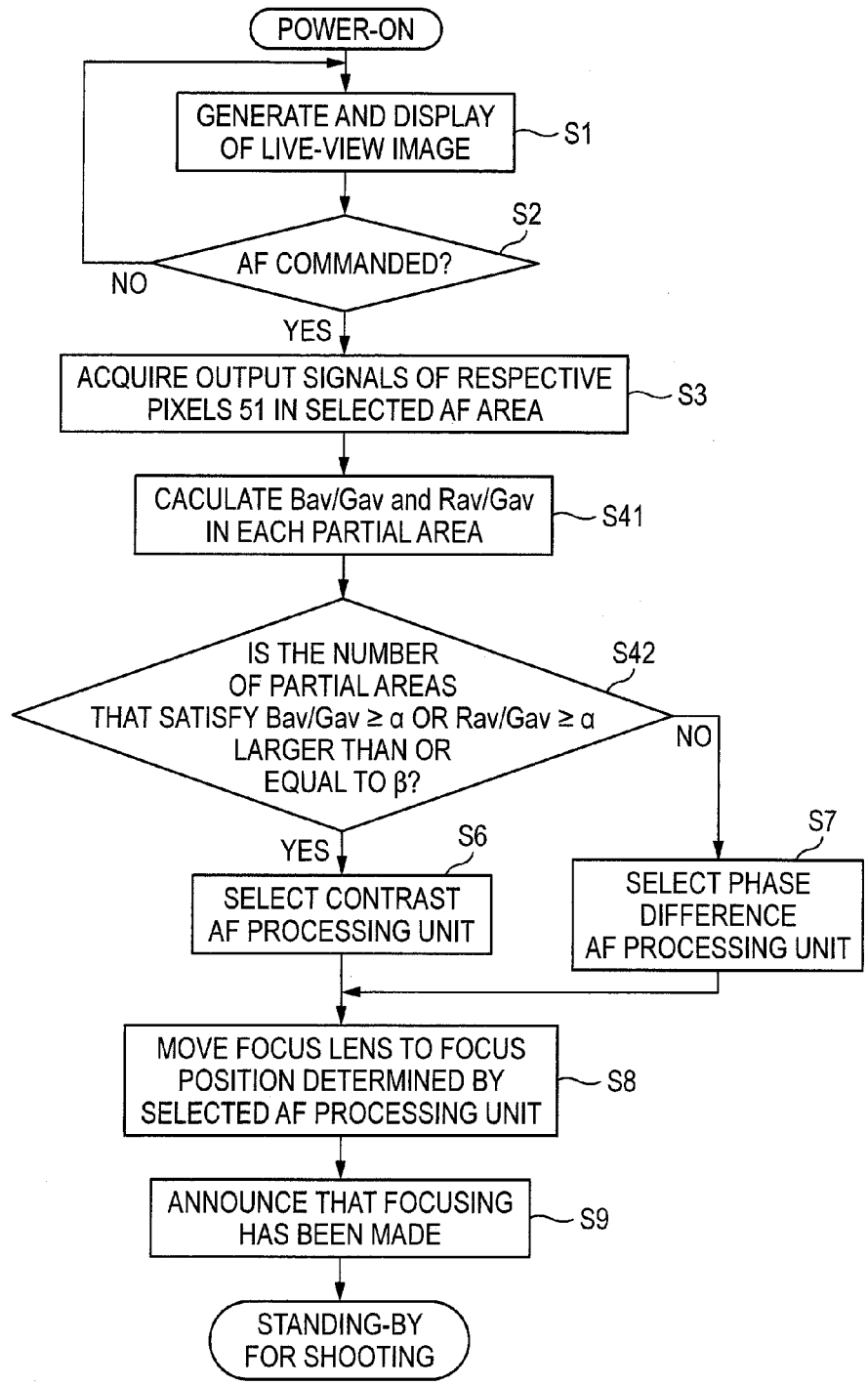
FIG. 9 is a flowchart for description of the AF operation according to the third modification of the digital camera shown in FIG. 1.

FIG. 8 illustrates a further example AF operation (third modification) of the digital camera shown in FIG. 1. FIG. 9 is a flowchart of its processing procedure. In FIG. 9, steps having the same ones in the flowchart of FIG. 4 are given the same reference symbols as the latter and descriptions therefor will be omitted; only different steps will be described below.

In the embodiment of FIG. 4, the judgment of step S5 is made using Bav/Gav and Rav/Gav calculated in a selected one of the nine AF areas 52 shown in FIG. 3. In contrast, in this modification, as shown in FIG. 8, one selected AF area 52 is divided into plural (e.g., 4×4=16) partial areas 52-*i* (i=1 to 16).

At step S41 which immediately follows step S3, the system control unit 11 calculates values of Bav/Gav and values of Rav/Gav in the 16 respective partial areas 52-*i*.

At the next step S42, the system control unit 11 judge whether the number of partial areas where Bav/Gav or Rav/Gav is larger than or equal to the threshold value α is larger than or equal to a threshold value β (e.g., β=8).

If judging at step S42 that the number of partial areas that satisfies the relationship Bav/Gav≥α or Rav/Gav≥α is larger than or equal to β (step S42: yes), the system control unit 11 moves to step S6, where it selects the contrast AF method.

If judging at step S42 that the number of partial areas that satisfy the relationship Bav/Gav≥α or Rav/Gav≥α is smaller than β (step S42: no), the system control unit 11 moves to step S7, where it selects the phase difference AF method.

Also in this modification, as in the modification of FIG. 7, step S31 may be provided at which a threshold value α is determined according to optical conditions (light angle information) and the position of an AF area 52. The threshold value β may also be determined according to optical conditions (light angle information) and the position of an AF area 52. The modification of FIG. 9 can also be applied to the modification of FIG. 6.

If the judgment result of step S42 in FIG. 9 is negative and there exists a partial area(s) that satisfies the relationship Bav/Gav≥α or Rav/Gav≥α, it is preferable that the phase difference AF processing unit 19 determines a focus position by the phase difference AF method using output signals of phase difference detection pixels 51 in partial areas other than that partial area(s).

Step S42 in FIG. 9 may be modified so that the number N of partial areas that satisfy the relationship Rav/Gav≥α is compared with β. Step S6 is executed if N≥β and step S7 is executed if N<β. Even this can provide a considerable advantage because as described above red light more likely causes color contamination than blue light.

In the above-described embodiment, whether to employ the phase difference AF method is determined according to a color composition of a subject color in an AF area. As a result, the probability of focusing when the phase difference AF method is employed is increased and AF processing can be performed at high speed.

Although the above-described embodiment is directed to the case that the solid-state imaging device 5 has the pixel arrangement shown in FIG. 2 or 5, the invention is not limited to such a case and can also be applied to a case the pixels are arranged in square lattice form.

Although in the embodiment the phase difference detection pixels 51L and 51R are pixels incorporating a G filter, the concept of the embodiment is also applicable to a case that they are pixels incorporating an R filter or a B filter. In either case, ratios between a component of the detection color of the phase difference detection pixels and components of the other colors are calculated and whether to perform phase difference AF or contrast AF is determined according the magnitudes of the calculated ratios.

The phase difference detection pixels 51L and 51R may be pixels incorporating a luminance filter which transmits a luminance component of light instead of a color filter. Examples of the luminance filter are a transparent filter and an ND filter. A structure in which no filter is disposed over the photoelectric conversion portion and light directly shines on the photoelectric conversion portion can also be regarded as having a luminance filter.

Where the phase difference detection pixels 51L and 51R are pixels incorporating a luminance filter, each of the phase difference detection pixels 51L and 51R detects all of R, G, and B components of light. Among those components, the red component most likely causes color contamination. Therefore, if a subject is reddish, the phase difference detection pixels 51L and 51R are likely affected to a large extent by color contamination, resulting in a reduction in phase difference AF accuracy.

In view of the above, where the phase difference detection pixels 51L and 51R are pixels incorporating a luminance filter, at step S5 in FIG. 4 the system control unit 11 calculates Rav/Gav and Rav/Bav. If Rav/Gav or Rav/Bav is larger than or equal to a threshold value, the system control unit 11 judges that the subject is reddish and causes execution of step S7. If both of Rav/Gav and Rav/Bav are smaller than the threshold value, the system control unit 11 causes execution of step S6.

In the description so far made, the contrast AF method or phase difference AF method is selected according to a judgment result of step S5 or S42 and AF is performed only by the selected method. However, if step S7 has been executed, at step S8 a focus control may be performed using both of the phase difference AF method and the contrast AF method.

More specifically, after the execution of step S7, the system control unit 11 moves the focus lens to a focus position determined by the phase difference AF processing unit 19. In this state, the system control unit 11 causes the contrast AF processing unit 18 to determine a focus position and moves the focus lens to the focus position determined by the contrast AF processing unit 18. The AF accuracy can be increased in this manner, that is, by performing phase difference AF first and then fine-adjusting the focus position by contrast AF.

Although the digital camera has been described above as an embodiment of the imaging apparatus according to the invention, the imaging apparatus is not limited to a digital camera. Other examples of the imaging apparatus according to the invention are a built-in or external camera for a PC and a portable terminal apparatus having a shooting function (described below).

Portable terminal apparatus as examples of the imaging apparatus according to the invention include a cell phone, a smartphone, a PDA (personal digital assistant), a portable game machine, etc. A smartphone will be described below in detail as an example with reference to the drawings.

Figure 10:
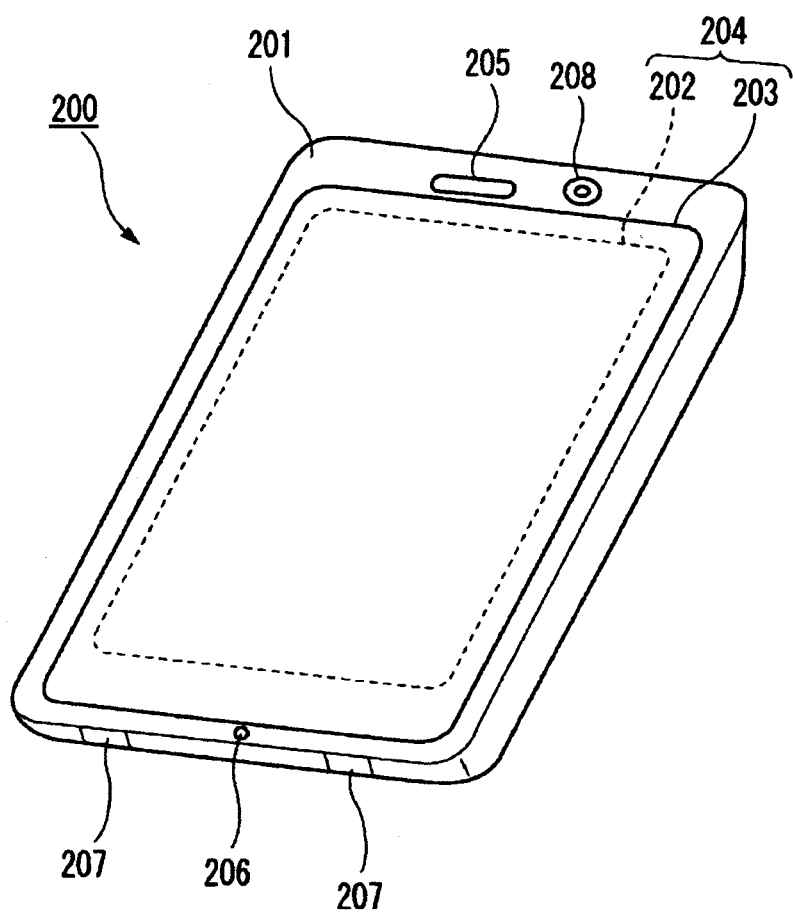
FIG. 10 shows an appearance of a smartphone that is another example of the imaging apparatus according to the invention.

FIG. 10 shows an appearance of a smartphone 200 according to the embodiment which is an example of the imaging apparatus according to the invention. The smartphone 200 shown in FIG. 10 has a flat-plate-like body 201 and one surface of the body 201 is provided with a display/input unit 204 which is an integrated unit of a display panel 202 as a display unit and a manipulation panel 203 as an input unit. The body 201 is equipped with a speaker 205, a microphone 206, manipulation members 207, and a camera unit 208. The configuration of the body 201 is not limited to the above one; for example, a configuration in which the display unit and the input unit are separated from each other and a configuration having a folding structure or a slide mechanism may be employed.

FIG. 11 is a block diagram showing the configuration of the smartphone 200 shown in FIG. 10. As shown in FIG. 11, the smartphone 200 is equipped with, as main constituent elements, a wireless communication unit 210, the display/input unit 204, a telephone unit 211, the manipulation members 207, the camera unit 208, a storage unit 212, an external input/output unit 213, a GPS (global positioning system) reception unit 214, a motion sensor unit 215, a power unit 216, and a main control unit 220. The smartphone 200 is also equipped with, as a main function, a wireless communication function for performing a mobile wireless communication via a base station BS (not shown) and a mobile communication network NW (not shown).

The wireless communication unit 210 serves to perform a wireless communication with a base station BS of the mobile communication network NW. By performing such wireless communications, the wireless communication unit 210 sends and receives various file data such as audio data and image data, e-mail data, etc. and receives web data, streaming data, etc.

The display/input unit 204 is what is called a touch panel that, under the control of the main control unit 220, displays an image (still image and moving image), text information, etc. and thereby gives information to a user visually as well as detects a user manipulation on displayed information. The display/input unit 204 is equipped with the display panel 202 and the manipulation panel 203.

The display panel 202 uses, as a display device, an LCD (liquid crystal display), an OELD (organic electroluminescence display), or the like.

The manipulation panel 203 is a device that is placed so as to enable visual recognition of an image displayed on the display screen of the display panel 202 and detects one or plural sets of coordinates of a manipulation by a user finger or a stylus. When manipulated by a user finger or a stylus, this device outputs, to the main control unit 220, a detection signal that is generated as a result of the manipulation. Then the main control unit 220 detects a manipulation position (coordinates) on the display panel 202 on the basis of the received detection signal.

As shown in FIG. 10, in the smartphone 200 which is an embodiment of the imaging apparatus according to the invention, the display/input unit 204 is configured as the integrated unit of the display panel 202 and the manipulation panel 203 is disposed in such a manner as to cover the display panel 202 completely.

Where this arrangement is employed, the manipulation panel 203 may have a function of detecting a user manipulation even outside the area of the display panel 202. In other words, the manipulation panel 203 may be provided with a detection area (hereinafter referred to as a "display area") corresponding to its portion that coextends with the display panel 202 and a detection area (hereinafter referred to as a "non-display area") corresponding to its peripheral portion that does not coextend with the display panel 202.

The size of the display area may be completely the same as that of the display panel 202 (they need not always be the same). The manipulation panel 203 may be provided with two sensing areas, that is, a peripheral portion and an inside portion that is a portion other than the peripheral portion. Furthermore, the width of the peripheral portion is designed as appropriate so as to be suitable for the size of the body 201 and other factors. Still further, the position detection method of the manipulation panel 203 any of various methods such as a matrix switch method, a resistive film method, a surface acoustic wave method, an infrared method, an electromagnetic induction method, and a capacitance method.

Equipped with the speaker 205 and the microphone 206, the telephone unit 211 serves to convert a user voice that is input through the microphone 206 into audio data that can be processed by the main control unit 220 and output the latter to the main control unit 220 and also serves to decode audio data that is received by the wireless communication unit 210 or the external input/output unit 213 and output decoded data from the speaker 205. As shown in FIG. 10, for example, the speaker 205 and the microphone 206 may be installed in the same surface as the display/input unit 204 is and a side surface of the body 201, respectively.

The manipulation members 207 are hardware keys using key switches or the like and serve to receive user instructions. For example, as shown in FIG. 10, the manipulation members 207 are push-button switches that are installed in a side surface of the body 201 of the smartphone 200 and are turned on when pushed down by a finger or the like and are turned off due to recovery force of a spring or the like when the finger is released.

The storage unit 212 serves to store control programs and control data of the main control unit 220, application software, address data in which a name, a telephone number, etc. of each party to communicate with are correlated with each other, data of e-mails that have been sent out or received, web data that have been downloaded by web browsing, and downloaded content data, and also serves to store streaming data etc. temporarily. The storage unit 212 consists of an internal storage unit 217 which is incorporated in smartphone 200 and an external storage unit 218 having a detachable external memory slot. Each of the internal storage unit 217 and the external storage unit 218 which constitute the storage unit 212 is implemented using a storage medium of any of such types as a flash memory, a hard disk drive, Multimedia Card micro, a card-type memory (e.g., microSD (registered trademark) memory), a RAM (random access memory), and a ROM (read-only memory).

The external input/output unit 213 plays a role of an interface with every external device to be connected to the smartphone 200, and serves to connect to an external device directly or indirectly by a communication line or the like (e.g., universal serial bus (USB) or IEEE 1394) or a network (e.g., Internet, wireless LAN, Bluetooth (registered trademark), RFID (Radio Frequency Identification), Infrared Data Association (IrDA; registered trademark), UWB (ultra-wideband; registered trademark), or ZigBee (registered trademark)).

Example external devices to be connected to the smartphone 200 are a wired/wireless headset, a wired/wireless external charger, a wired/wireless data port, a memory card and a SIM (Subscriber Identity Module) card and a UIM (User Identity Module) card which are connected via a card socket, an external audio/video device which is connected via an audio/video I/O (input/output) terminal, an external audio/video device which is connected wirelessly, a smartphone which is connected by wire or wirelessly, a personal computer which is connected by wire or wirelessly, a PDA which is connected by wire or wirelessly, a personal computer which is connected by wire or wirelessly, and an earphone. The external input/output unit 213 can give data transmitted from such an external device to internal constituent elements of the smartphone 200 and allows internal data of the smartphone 200 to be transmitted to such an external device.

According to instructions from the main control unit 220, the GPS reception unit 214 receives plural GPS signals transmitted from GPS satellites ST1-STn, performs positioning calculation processing on the basis of the received GPS signals, and detect a position (i.e., latitude, longitude, and height) of the smartphone 200. If position information can be acquired from the wireless communication unit 210 or the external input/output unit 213 (e.g., wireless LAN), the GPS reception unit 214 can also detect a position using that position information.

Equipped with, for example, a 3-axis acceleration sensor, the motion sensor unit 215 detects physical motion of the smartphone 200 according to instructions from the main control unit 220, as a result of which a movement direction and acceleration of the smartphone 200 can be detected. Detection results are output to the main control unit 220.

The power unit 216 supplies power stored in a battery (not shown) to the individual units of the smartphone 200 according to an instruction from the main control unit 220.

Equipped with a microprocessor, the main control unit 220 operates according to control programs and control data stored in the storage unit 212 and supervises the individual units of the smartphone 200. To perform a voice communication or a data communication via the wireless communication unit 210, the main control unit 220 has a mobile communication control function for controlling the individual units for communication and application processing functions.

The application processing functions are realized in such a manner that the main control unit 220 operates according to application software that is stored in the storage unit 212. For example, the application processing functions are an infrared communication function of performing a data communication with a confronting device by controlling the external input/output unit 213, an e-mail function of sending and receiving an e-mail, and a web browsing function of browsing a web page.

The main control unit 220 has an image processing function for, for example, displaying video on the display/input unit 204 on the basis of image data (still image data or moving image data) such as reception data or downloaded streaming data. The image processing function means a function that the main control unit 220 decodes image data as mentioned above, performs image processing on a decoding result, and displays a resulting image on the display/input unit 204.

Furthermore, the main control unit 220 performs a display control on the display panel 202 and a manipulation detection control for detecting a user manipulation via the manipulation members 207 and the manipulation panel 203. By performing a display control, the main control unit 220 displays icons for activation of application software, software keys such as scroll bars, and a window for writing an e-mail. The scroll bars are software keys for receiving an instruction for moving a display portion of, for example, a large image that cannot be displayed fully in the display area of the display panel 202.

By performing a manipulation detection control, the main control unit 220 detects a user manipulation that is made through the manipulation members 207, receives a manipulation on an icon as mentioned above or input of a character string to an input box of a window as mentioned above, and receives a display image scroll request that is made through a scroll bar.

The main control unit 220 also has a touch panel control function that the main control unit 220 judges whether a position of a manipulation on the manipulation panel 203 is in the coextending portion (display area) that coextends with the display panel 202 or the other portion, that is, the peripheral portion (non-display area) that does not coextend with the display panel 202 by performing a manipulation detection control and controls the sensing areas of the manipulation panel 203 and the display positions of software keys.

The main control unit 220 can also detect a gesture manipulation on the manipulation panel 203 and performs a preset function according to the detected gesture manipulation. The gesture manipulation is not a conventional simple touch manipulation but a manipulation of drawing a locus with a finger or the like, specifying plural positions simultaneously, or drawing loci from plural position to at least one position by combining such manipulations.

The camera unit 208 has an AF function and includes those units of the digital camera shown in FIG. 1 which exclude the external memory control unit 20, the recording medium 21, the display control unit 22, the display unit 23, and the manipulation unit 14. Shot image data generated by the camera unit 208 can be recorded in the storage unit 212 or output via the input/output unit 213 or the wireless communication unit 210. Although in the smartphone 200 shown in FIG. 9 the camera unit 208 is incorporated in the same surface as the display/input unit 204 is, the installation position of the camera unit 208 is not limited to that position; the camera unit 208 may be installed on the back side of the display/input unit 204.

The camera unit 208 can used for various functions of the smartphone 200. For example, an image acquired by the camera unit 208 can be displayed on the display panel 202 or used as one manipulation input made through the manipulation panel 203. The GPS reception unit 214 can detect a position by referring to an image that is supplied from the camera unit 208. Furthermore, an optical axis direction of the camera unit 208 of the smartphone 200 can be judged or its current use environment can be judged by referring to an image supplied from the camera unit 208 using or without using the 3-axis acceleration sensor. Naturally, an image supplied from the camera unit 208 can be used in application software.

In addition, an operation is possible that image data of a still image or a moving image is added with position information acquired by the GPS reception unit 214, audio information acquired by the microphone 206 (may be converted into text information by the main control unit or the like through audio-to-text conversion), posture information acquire by the motion sensor unit 215, or another kind of information and is then recorded in the recording unit 212 or output via the input/output unit 213 or the wireless communication unit 210.

Also in the smartphone 200 having the above configuration, high-speed, high-accuracy AF processing can be realized in such a manner that the camera unit 208 performs the operation shown in FIG. 4, 6, 7, or 9 using the solid-state imaging device 5 as an imaging device of the camera unit 208.

In taking a subject image using the smartphone 200, because of a use of a small solid-state imaging device, it is highly probable that oblique light is incident on the pixels, that is, the AF function may be degraded due to the above-described color contamination.

However, the smartphone 200 has the two AF functions, that is, the phase difference AF function and the contract AF function, and selects between the two AF functions according to a subject color in the same manner as in the embodiment of FIG. 4, 6, 7, or 9. As a result, the probability of focusing when the phase difference AF function is increased and the contract AF function is selected for a subject that is not suitable for phase difference AF processing.

As described above, the following items are disclosed in this specification:

The disclosed imaging apparatus is an imaging apparatus having an imaging device that shoots a subject via an imaging optical system including a focus lens, wherein the imaging device includes plural imaging pixels and plural phase difference detection pixels arranged on a photodetecting surface; the plural imaging pixels include imaging pixels of at least three kinds that are different in detection color; the imaging apparatus comprises a focus control unit which selectively performs one of a focus control by a phase difference AF method that uses output signals of the phase difference detection pixels and a focus control by a contrast AF method that uses output signals of the imaging pixels; and the focus control unit decides whether to perform a focus control by the phase difference AF method according to a color of a subject image taken in a phase difference detection area that is set for phase difference detection on the photodetecting surface and includes imaging pixels of the at least three kinds and phase difference detection pixels.

In the disclosed imaging apparatus, the phase difference detection pixels are for detection of light having the same color as a detection color of imaging pixels of one of the at least three kinds; and where the detection color of the phase difference detection pixels is a first color, the focus control unit judges the color of the subject image on the basis of the magnitude of a ratio between a first output signal amount representing output signal amounts of imaging pixels for detection of light having the first color in the phase difference detection area and a second output signal amount representing output signal amounts of imaging pixels for detection of light having the same color as a detection color of imaging pixels adjacent to the phase difference detection pixels among imaging pixels for detection of light having different colors from the first color in the phase difference detection area.

In the disclosed imaging apparatus, where the ratio is a proportion of the second output signal amount to the first output signal amount, the focus control unit decides to perform only a focus control by the contrast AF method if the proportion is higher than or equal to a first threshold value and decides to perform a focus control by the phase difference AF method if the proportion is lower than the first threshold value.

In the disclosed imaging apparatus, the focus control unit divides the phase difference detection area into plural partial areas, calculates the proportion in each of the partial areas, and decides to perform only a focus control by the contrast AF method if the number of partial areas where the proportion is higher than or equal to the first threshold value is larger than or equal to a second threshold value and decides to perform a focus control by the phase difference AF method if the number is smaller than the second threshold value.

In the disclosed imaging apparatus, if deciding to perform a focus control by the phase difference AF method, the focus control unit performs the focus control by the phase difference AF method using output signals of phase difference detection pixels in partial areas other than the partial areas where the proportion is higher than or equal to the first threshold value.

In the disclosed imaging apparatus, the focus control unit sets the first threshold value according to an optical condition of the imaging optical system.

In the disclosed imaging apparatus, the focus control unit sets the first threshold value according to the optical condition and a position of the phase difference detection area on the photodetecting surface.

In the disclosed imaging apparatus, the focus control unit sets the second threshold value according to an optical condition of the imaging optical system.

In the disclosed imaging apparatus, the focus control unit sets the second threshold value according to the optical condition and a position of the phase difference detection area on the photodetecting surface.

In the disclosed imaging apparatus, the optical condition is at least one of an F value of the imaging optical system, a focal length of the imaging optical system, and a position of the focus lens.

In the disclosed imaging apparatus, the focus control unit decides whether to perform a focus control by the phase difference AF method before reception of an instruction to perform a focus control.

The disclosed focus control method is a focus control method of an imaging apparatus having an imaging device that shoots a subject via an imaging optical system including a focus lens, wherein the imaging device includes plural imaging pixels and plural phase difference detection pixels arranged on a photodetecting surface; the plural imaging pixels include imaging pixels of at least three kinds that are different in detection color; the focus control method comprises a focus control step of selectively performing one of a focus control by a phase difference AF method that uses output signals of the phase difference detection pixels and a focus control by a contrast AF method that uses output signals of the imaging pixels; and the focus control step decides whether to perform a focus control by the phase difference AF method according to a color of a subject image taken in a phase difference detection area that is set for phase difference detection on the photodetecting surface and includes imaging pixels of the at least three kinds and phase difference detection pixels.

According to the above-described embodiments, the probability that focusing is attained by phase difference AF processing when the phase difference AF method is selected is increased. Furthermore, since the contract AF method is selected immediately for a subject that is not suitable for phase difference AF processing, high-speed AF can be realized.

INDUSTRIAL APPLICABILITY

In the imaging apparatus according to the invention, whether to employ the phase difference AF method is determined according to a subject color. As a result, the probability of focusing when the phase difference AF method is selected is increased and AF processing can be performed at a higher speed. As such, the imaging apparatus according to the invention is useful when applied to digital cameras, smartphones, etc.

Although the invention has been described above using the particular embodiments, the invention is not limited to those embodiments and various changes are possible without departing from the technical concept of the disclosed invention.

DESCRIPTION OF SYMBOLS

1: Shooting lens
5: Solid-state imaging device
11: System control unit (focus control unit)
17: Digital signal processing unit
18: Contrast AF processing unit
19: Phase difference AF processing unit
51: Pixel
51L, 51R: Phase difference detection pixel
a, b, c: Opening of light shield film
52: AF area
52-*i*: Partial area

The invention claimed is:

1. An imaging apparatus having an imaging device that shoots a subject via an imaging optical system comprising a focus lens, wherein:
the imaging device comprises plural imaging pixels and plural phase difference detection pixels arranged on a photodetecting surface;
the plural imaging pixels comprise imaging pixels of at least three kinds that are different in detection color;
the imaging apparatus comprises a focus control unit which selectively performs one of a focus control by a phase difference AF method that uses output signals of the phase difference detection pixels and a focus control by a contrast AF method that uses output signals of the imaging pixels;
the focus control unit decides whether to perform a focus control by the phase difference AF method according to a color of a subject image taken in a phase difference detection area that is set for phase difference detection on the photodetecting surface and comprises imaging pixels of the at least three kinds and phase difference detection pixels;
the phase difference detection pixels are for detection of light having the same color as a detection color of imaging pixels of one of the at least three kinds; and
where the detection color of the phase difference detection pixels is a first color, the focus control unit judges the color of the subject image on the basis of the magnitude of a ratio between a first output signal amount representing output signal amounts of imaging pixels for detection of light having the first color in the phase difference detection area and a second output signal amount representing output signal amounts of imaging pixels for detection of light having the same color as a detection color of imaging pixels adjacent to the phase difference detection pixels among imaging pixels for detection of light having different colors from the first color in the phase difference detection area.

2. The imaging apparatus according to claim 1, wherein where the ratio is a proportion of the second output signal amount to the first output signal amount, the focus control unit decides to perform only a focus control by the contrast AF method if the proportion is higher than or equal to a first threshold value and decides to perform a focus control by the phase difference AF method if the proportion is lower than the first threshold value.

3. The imaging apparatus according to claim 2, wherein the focus control unit divides the phase difference detection area into plural partial areas, calculates the proportion in each of the partial areas, and decides to perform only a focus control by the contrast AF method if the number of partial areas where the proportion is higher than or equal to the first threshold value is larger than or equal to a second threshold value and decides to perform a focus control by the phase difference AF method if the number is smaller than the second threshold value.

4. The imaging apparatus according to claim 3, wherein if deciding to perform a focus control by the phase difference AF method, the focus control unit performs the focus control by the phase difference AF method using output signals of phase difference detection pixels in partial areas other than the partial areas where the proportion is higher than or equal to the first threshold value.

5. The imaging apparatus according to claim 2, wherein the focus control unit sets the first threshold value according to an optical condition of the imaging optical system.

6. The imaging apparatus according to claim 5, wherein the focus control unit sets the first threshold value according to the optical condition and a position of the phase difference detection area on the photodetecting surface.

7. The imaging apparatus according to claim 3, wherein the focus control unit sets the second threshold value according to an optical condition of the imaging optical system.

8. The imaging apparatus according to claim 7, wherein the focus control unit sets the second threshold value according to the optical condition and a position of the phase difference detection area on the photodetecting surface.

9. The imaging apparatus according to claim 5, wherein the optical condition is at least one of an F value of the imaging optical system, a focal length of the imaging optical system, and a position of the focus lens.

10. The imaging apparatus according to claim 1, wherein the focus control unit decides whether to perform a focus control by the phase difference AF method before reception of an instruction to perform a focus control.

11. A focus control method of an imaging apparatus having an imaging device that shoots a subject via an imaging optical system comprising a focus lens, wherein:

the imaging device comprises plural imaging pixels and plural phase difference detection pixels arranged on a photodetecting surface;

the plural imaging pixels comprise imaging pixels of at least three kinds that are different in detection color;

the focus control method comprises a focus control step of selectively performing one of a focus control by a phase difference AF method that uses output signals of the phase difference detection pixels and a focus control by a contrast AF method that uses output signals of the imaging pixels;

the focus control step decides whether to perform a focus control by the phase difference AF method according to a color of a subject image taken in a phase difference detection area that is set for phase difference detection on the photodetecting surface and comprises imaging pixels of the at least three kinds and phase difference detection pixels;

the phase difference detection pixels are for detection of light having the same color as a detection color of imaging pixels of one of the at least three kinds; and where the detection color of the phase difference detection pixels is a first color, the focus control step judges the color of the subject image on the basis of the magnitude of a ratio between a first output signal amount representing output signal amounts of imaging pixels for detection of light having the first color in the phase difference detection area and a second output signal amount representing output signal amounts of imaging pixels for detection of light having the same color as a detection color of imaging pixels adjacent to the phase difference detection pixels among imaging pixels for detection of light having different colors from the first color in the phase difference detection area.

* * * * *